UNITED STATES PATENT OFFICE 2,157,389

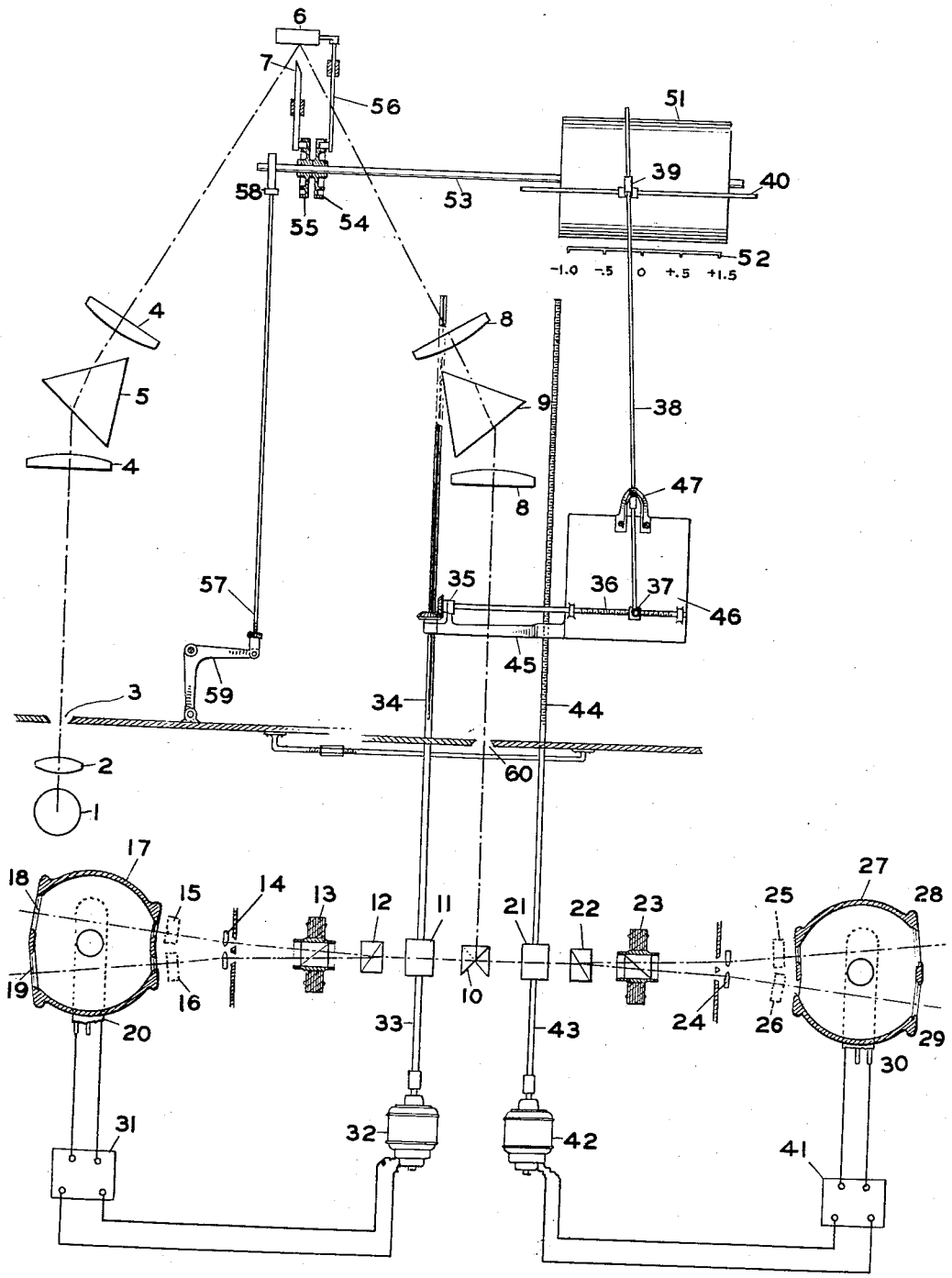

SPECTROPHOTOMETRY

Robert Hiram Park, Short Hills, N. J., assignor to The Calco Chemical Company, Inc., Bound Brook, N. J., a corporation of Delaware Application January 14, 1938, Serial No. 184,917

5 Claims. (Cl. 234—1.5)

This invention relates to improved recording instruments for use in spectrophotometry. More particularly, the invention relates to devices which permit a direct recording of differences between two colored samples.

There have been many proposals in the past to construct recording spectrophotometers which will draw curves giving the spectral characteristics of colored samples. A type which has achieved extensive commercial success is that employing the method of flickering beams, the commercial device being described and claimed in the patent to Orrin W. Pineo, No. 2,107,836 issued February 8, 1938. In this device, two samples, one a standard white for reflectance measurements or a standard colorless solution for transmission measurements, and the other a colored sample or solution to be measured, are placed in an integrating sphere in the case of the reflectance samples or in cells in front of the openings to an integrating sphere where solutions are being tested. The device takes light of a definite narrow spectral band from a monochromator, passes it through a photometering prism which alters the plane of polarization of the light and then through a Wollaston prism which splits the beam into two diverging beams polarized at right angles to each other, the two beams then being passed through a flickering mechanism which causes the beams alternately to increase and decrease in intensity. In the Pineo application referred to above, this flickering mechanism is a Rochon prism rotated by a synchronous motor. Other devices, such as retardation plates, Kerr cells, or similar devices may also be used to produce flickering as described and claimed in another patent to Orrin W. Pineo, No. 2,126,410 issued August 9, 1938.

When the two beams are of equal intensity, if the samples show the same reflectance or transmission for a given narrow spectral band there will be no change in total light in the integrating sphere because as one beam increases the other decreases and therefore the total remains constant. If, however, one sample in one beam either reflects or transmits more light at a particular wave length in the spectrum than does the other, the total light in the integrating sphere will pulsate at flicker frequency. The integrated light from the sphere is applied to a photocell which is placed in a grid circuit of a very high gain audiofrequency amplifier using power tubes in the output stage capable of giving several watts of power; the amplified flicker frequency current is then fed into one of the windings of a suitable motor driving the photometering prism, preferably through a drive of varying ratio so that angular rotation of the photometering prism may be translated into per cent variation of reflectance or transmission of the sample to be tested. In operation, of course, the photometering prism is rotated until the unbalance in the light from one beam in the sphere is neutralized. Suitable drive from the motor operating the photometering prism moves a pencil or other device to record a curve on cross section paper which is moved along the other axis in proportion to the travel through the spectrum of the band of light from the monochromator.

It is frequently desirable to measure a colored standard against a colored sample in order to determine the deviations at different wave lengths throughout the spectrum, which deviations, if desired, can be integrated with respect to the proper function to give precise evaluations of differences of tristimulus data. A mechanical integrator can be attached directly to the output of the device of the present invention. It is possible to take curves of reflectance or transmission of the sample and standard run against a white standard on a Pineo spectrophotometer and calculate the values but this is a tedious procedure and the accuracy is especially low in portions of the spectrum where the transmission or reflectance is low and where the errors in the machine and in computation form a much larger percentage of the curve ordinate than they do at portions of the curve where transmission or reflectance is relatively large.

It has been proposed to read a colored standard against a colored sample in a recording spectrophotometer. This procedure improves the accuracy of the machine in the portions of the spectrum where the transmission or reflectance is comparatively small but the record obtained is a ratio between the transmission or reflectance of the sample and that of the standard. For many purposes a ratio is not useful because an important practical use of comparisons between colored standards and colored samples is to evaluate accurately visual differences to a normal observer and for this purpose differences are necessary and not ratios.

The present invention has for its purpose the production of a record in a differential spectrophotometer of the flickering beam type which will record directly the differences in reflectance or transmission between a colored sample and a colored standard.

According to the present invention a double spectrophotometer is used, one side of which operates on a colored standard and a colored sample to be compared and the other side on a similar colored standard and a white standard. Recording of the first side is in terms of the ratio of reflectance or transmission of colored sample to colored standard minus one and this response is multiplied by the response from the second half of the spectrophotometer in which the ratio of colored standard to white standard is measured. A differential reading is thus obtained which reads ratio of colored sample to white standard minus ratio of colored standard to white standard. Inasmuch as the white standard is for all practical purposes unity or its departure from unity is a known curve with small deviation, the reading is in fact the difference in reflectance or transmission between colored sample and colored standard which is what is desired.

The present invention not only permits a direct record on a suitable coordinate paper of the algebraic difference of transmission or reflectance of colored sample and colored standard but the accuracy does not suffer in the regions where the reflectance or transmission of both sample and standard are low because one side of the spectrophotometer is measuring sample against standard and the sensitivity is not seriously affected by the absolute values of transmission or reflectance. Accordingly, machine errors which would be a serious factor in single curves separately comparing a white standard to a colored sample and colored standard in regions of low reflectance or in regions of low transmission do not seriously affect the accuracy of readings of my device.

Since in effect the present invention contemplates two spectrophotometric optical systems, the drives of which multiply each other to give a differential reading, the optical systems of the spectrophotometers can be entirely separate and independent providing a common monochromator drive is employed or means are provided to insure both monochromators keeping in step. However, for practical purposes, it is unnecessary to duplicate the monochromators and instead a single monochromator with a beam splitting prism may be used, one half of the light going to one spectrophotometric system and one half to the other. This construction is preferred because of its economy both of space and money, but the invention is in no sense limited thereto since the detail of the system which produces monochromatic light entering the photometric system of the invention forms no part of the invention and any suitable system or systems can be employed. The optical parts of the photometric systems are not interested in the past history of the monochromatic light they receive.

The present invention itself does not alter the details of the optical elements of the spectrophotometric systems used. It operates precisely as if it were part of a single spectrophotometer. This is an important advantage of the present invention since the highly efficient optical systems of the various types of spectrophotometers such as those described in the Pineo applications referred to above may be used without change. The present invention therefore utilizes to the full the great advances in accuracy and reliability represented by these types of spectrophotometer.

The invention will be described in detail in conjunction with the drawing which illustrates in diagrammatic form a double Pineo spectrophotometer embodying the features of the present invention.

In the drawing, the source of light for the monochromator is shown at 1. The light rays are condensed by a condensing lens 2, pass through a variable inlet slit 3, through a prism 5 with collimator lenses 4 down to a second movable slit defined by the mirror 6 and the knife edge 7, thence through a second prism 9 provided with collimator lenses 8 and finally through the outlet slit 60. The double monochromator illustrated is of standard design as is described for example in the Pineo application, Serial No. 54,829, filed December 17, 1935. Its operation is the same as described in the Pineo application in which variable slits produce a band of light of constant frequency range or wave length range throughout the spectrum. The drive mechanism is slightly modified to operate the type of recorder used in the present invention. The operation of the variable slit will be described in detail below.

The monochromatic light emerging from the slit 60 strikes a beam splitting prism 10 which divides the light into two beams which pass through photometering mechanisms 11 and 21 respectively, which are preferably of the movable prism type described in the Pineo Patent No. 2,107,836 referred to above. The polarized light beams leaving the photometering devices 11 and 21 each pass through a Wollaston prism, shown respectively at 12 and 22 on the drawing, where they are each split into two diverging beams polarized at right angles to each other. The divergent beams pass through flicker prisms 13 and 23 respectively which are rotated by synchronous motors to provide a definite flicker frequency. The beams then pass through diverging lenses 14 and 24 in order to spread them somewhat further so as to accommodate larger sample. The split beams enter the integrating spheres 17 and 27, being reflected from the samples and standards shown at 18, 19, 28 and 29 respectively. 18 and 19 are a colored sample and colored standard, and 28 and 29 a white standard and similar colored standard. Where the transmission of solutions is to be measured rather than the reflectance of samples, the cells 15, 16, 25 and 26 (shown in dotted lines) may be used.

Any unbalance in reflectance of the samples and standards 18, 19, 28 and 29 result in flicker frequency pulsations of light in the integrating spheres 17 and 27. These light pulsations impinging on photocells 20 and 30 produce fluctuating currents and voltages at flicker frequency and as the photocells are in the input circuits of amplifiers 31 and 41 respectively, the feeble flicker frequency currents in the photocells are amplified and the amplified flicker frequency currents from the output stages of the amplifiers 31 and 41 are carried to one winding of the motors 32 and 42 respectively; the other winding of these motors are supplied with alternating current of flicker frequency. Thus the motors constitute extremely sharply tuned devices which will respond substantially only to alternating current of flicker fresuency from the amplifiers. As long as the unbalance lasts, the motors 32 and 42 will turn until the photometering prisms in the photometering mechanisms 11 and 21 have been turned sufficiently so that the unbalance in the reflectance or transmission of the samples is compensated by a corresponding unbalance in the opposite phase in the flickering beams.

The photometering mechanisms are shown purely diagrammatically at the 11 and 21 on the drawing as the particular design of the mechanism forms no part of the present invention. In the Pineo type of spectrophotometer, photometering is effected by rotating a polarizing prism. Unbalance in the light in the different beams is not compensated for linearly in proportion to the rotation of the photometering prism. On the contrary, the ratio of unbalance between the two beams which measures ratio of transmission or reflectance as the case may be varies in proportion to the square of the tangent of the angle through which the photometering prism is turned. This necessitates interposition of a drive of varying ratio in the photometering mechanism having the tangent squared function incorporated in it. Such a drive, for example, is described and claimed in the copending application of Orrin W. Pineo, Serial No. 158,821 filed August 12, 1937 and the Pineo Patent No. 2,107,836 referred to above. In the case of the photometering mechanism 21, it is desired to turn the shaft 43 in proportion to the ratio of transmission or reflectance of the samples and standards on this side of the photometer and therefore this photometering mechanism is provided with a drive of varying ratio having a simple tangent squared variation.

Shaft 33 is provided with splines 34 and shaft 43 is provided with a thread 44. A bevel gear moves along the splines 34 and drives shaft 36 through another bevel gear 35. This shaft is journaled in a frame 46 and on an arm 45, the latter being provided with a nut which moves on the threads 44. The frame 46 is therefore moved vertically by rotation of the shaft 43 and is such that the distance from journal 47 to journal 39 is proportional to the ratio of reflectance or transmission of the colored standard 29 and the white standard 28 or the standard colored solution 26 and the colorless solution 25, respectively.

The shaft 36 is threaded and carries a nut 37 in which is journaled a rod 38 which likewise passes through a rotatable journal 47 also mounted in the frame 46. The initial position of the nut 37 on the threaded shaft 36 is such that distance the nut moves from a position directly opposite the journal 47 is in proportion to the ratio minus one of reflectance of the colored sample 18 and colored standard 19. Depending on the initial position of the nut 37, the rotation of the shaft 33 and hence shaft 36 may either be in proportion to the square of the tangent of the angle through which the photometering prism is turned or to the tangent squared minus one. The rod passes through another journal 39 which can rotate about a vertical axis and slide on the support 40 and which is provided with a suitable stylus or other recording mechanism capable of tracing a line on the drum 51. This drum is rotated by the shaft 53 in proportion to the travel of the monochromated light band through the spectrum. In practice, the shaft 53 is driven by a suitable motor or other driving means, (not shown), at a uniform rate and the travel of the band of monochromated light through the spectrum is effected by the cam drive 54 moving the mirror 6 through the rod 56.

As described in the Pineo application Serial No. 54,829 referred to above, it is necessary to vary the physical width of the slits of the monochromator in order to preserve a band of constant frequency range or wave length range throughout the spectrum. This is effected, in the case of the slit defined by the edge 7 and the mirror 6, by means of the differential cams 54 and 55. In the case of the slits 3 and 60, the slits are varied by means of the cam 58 and rod 57 and the bell crank 59 which moves one edge of each slit. These drives are shown purely diagrammatically as their mechanical construction forms no part of the present invention. I prefer to use a drive in which the slit width can be varied without dismantling the apparatus as is described in the Pineo application referred to immediately above, but any other suitable type of drive, whether adjustable or non-adjustable, may be used.

The drum 51 preferably carries suitable cross section paper with a central zero line so that the graph drawn by the stylus attached to 39 will represent differences in transmission between the colored standard and the colored sample. A suitable scale 52 may also be provided for visual observation. The movement of the recording element 39 will define differences in transmission or reflectance between colored standard and colored sample and not ratio because the movement of the nut 37 is proportional to the ratio minus one of colored sample to colored standard and this is multiplied by the motion of the table 46 which is proportional to the ratio of reflectance or transmission of colored standard to white standard. The product is the difference between reflectance or transmission of colored sample and colored standard. Mathematically the expression is derived as follows:

$$\left(\frac{R_2}{R_1}-1\right)\times\left(\frac{R_1}{R_0}\right)=\frac{R_2}{R_0}-\frac{R_1}{R_0}$$

Where $R_2$ is the reflectance or transmission of the colored sample; $R_1$ the reflectance or transmission of the colored standard and $R_0$ the reflectance or transmission of the white standard. Since $R_0$ is substantially unity, the expression reduces to $R_2-R_1$ and this is what is plotted on the surface of the drum 51.

Percentage of transmission and reflectance may be considered in terms of absorption. In other words, the amount of light which is transmitted by a given colored sample at a given wave length is the total incident light less the fraction absorbed. In the case of reflection, the same is true. The only difference is in the direction of the light not absorbed which continues in the same direction in case of transmission and which is turned in different directions in the case of reflection. The equations which define the operation of the spectrophotometer of the present invention may, therefore, be expressed in terms of absorption using the following transformation equation: $R=1-A$ where R is the reflectance or transmission and A is the fraction of incident light absorbed. The formula then becomes:

$$\left(\frac{1-A_2}{1-A_1}-1\right)\times\frac{1-A_1}{1-A_0}=\frac{A_1-A_2}{1-A_0}$$

where $A_0$, $A_1$ and $A_2$ are respectively the fractions of the light absorbed to give reflectances or transmissions $R_0$, $R_1$ and $R_2$. Since the absorption $A_0$ of the white standard is substantially zero, the right-hand member of the equation becomes $A_1-A_2$.

It is desirable to integrate the results obtained on the present machine and an integrator such as that described in the United States Patent No.

1,799,134 may be applied to the output of the machine, the rotating shaft of the integrator of course being connected to shaft 53 and the sliding shaft being actuated by the nut 39.

The differential recorder is shown in the form of a preferred mechanical device which I have found to give very satisfactory results in practice. Obviously, of course, a different lever arrangement may be used, for example, the lever may be an optical one. Thus, the movement of the nut 37 may rotate a mirror which reflects a spot of light on photographically sensitive material on the drum 51.

The necessity for causing movement of the nut 37 and the frame 46 to be in proportion to the ratios in transmission or reflectance measured in the spheres 17 and 27 respectively requires a drive of varying ratio somewhere between the photometering prisms 11 and 21 and the nut 37 and the frame 46 respectively. As shown in the drawing, which constitutes a preferred modification, the varying ratio drive, for example, a cam drive, is incorporated in the photometering mechanisms 11 and 21 respectively. This is in practice the most desirable arrangement. It is, however, not the only one which will permit accurate results because the varying ratio drive may be located anywhere between the photometering prism 11 and the nut 37 and between the photometering prism 21 and the frame 46. Thus, for example, the prism could be driven directly and the pitch of the threads 44 could be varied so that the movement of the framework 46 would be in proportion to the square of the tangent of the angle through which the photometering prism 21 is moved. Such a device operates effectively but requires an accurate and expensive variable pitch thread. Similarly a varying ratio drive can be inserted between the bevel gear 35 and the nut 37. This may be effected by a suitable cam or the thread on the shaft 36 can have a variable pitch. Other arrangements of varying ratio drives may be employed, it being apparent therefore that in its broadest principle the present invention is not limited to a particular arrangement of varying ratio drive in either or both of the photometering mechanisms.

Rotating polarizing prisms 13 and 23 are shown in the drawing as producing flicker. This type which is specifically described in the Pineo Patent No. 2,107,836 referred to above is the one used in commercial machines at the present time. It is simple, cheap and effective but suffers somewhat in accuracy when measuring the reflectance of samples and standards which do not respond uniformly to polarized light in all planes. This inaccuracy results from the fact that the flickering beams consist of polarized light with the plane of polarization of each beam rotating at one half flicker frequency. Where greater accuracy is desired a flickering device in which the state of polarization of the light encountering the samples in each beam is non-varying may be employed. Such flickering devices are described and claimed in the Pineo Patent No. 2,126,410 issued August 9, 1938. The operation of the present invention is, of course, not affected by the particular flickering mechanism used except to the extent that the accuracy will be determined in each case by the characteristics of the flickering mechanism.

In the specific description of the invention above, a photometering prism is used in order to compensate for varying reflectance or transmission. This is the most accurate and satisfactory photometering mechanism. It is not, however, the only one which can be used. On the contrary, any device which will reduce the intensity of one of the flickering beams at the expense of the other can be employed, such as for example iris diaphragms. The invention is therefore not limited to the particular method by which flickering and photometering is effected so long as they produce a differential mechanical displacement in proportion to the difference between the reflectances or transmissions of the samples and standards.

What I claim is:

1. A differential spectrophotometric system comprising monochromating means for passing bands of monochromatic light of equal wave length through two photometric systems, one containing means for measuring the ratio $$\frac{A_1-A_2}{1-A_1}$$

where $A_1$ is the fraction of incident light absorbed by a colored standard and $A_2$ is the fraction of light absorbed by a colored sample, in terms of mechanical movement and the other containing means for measuring the ratio of $$\frac{1-A_1}{1-A_0}$$

where $A_1$ is the fraction of light absorbed by a similar colored standard and $A_0$ is the fraction of light absorbed by a white standard, in terms of mechanical movement and means for combining the mechanical movements to move an element in proportion to the product of the two mechanical movements.

2. A differential recording spectrophotometric system comprising monochromating means for passing bands of monochromatic light of equal wave length through two photometric systems, one containing means for measuring the ratio $$\frac{A_1-A_2}{1-A_1}$$

where $A_1$ is the fraction of incident light absorbed by a colored standard and $A_2$ is the fraction of light absorbed by a colored sample, in terms of mechanical movement and the other containing means for measuring the ratio of $$\frac{1-A_1}{1-A_0}$$

where $A_1$ is the fraction of light absorbed by a similar colored standard and $A_0$ is the fraction of light absorbed by a white standard, in terms of mechanical movement, means for causing the bands of monochromated light entering the photometering systems to pass through the spectrum, a recording surface, means for moving the recording surface in one direction in proportion to the passage of the bands of monochromated light through the spectrum, a recording instrument movable over the recording surface at right angles to the movement of the surface and means for causing the recording element to move in proportion to the product of the two mechanical movements.

3. A differential recording spectrophotometric system of the flickering beam type comprising monochromating means for passing bands of monochromated light of equal wave length through two photometric systems of the flickering beam type, one containing means for measuring the ratio $$\frac{A_1-A_2}{1-A_1}$$

where $A_1$ is the fraction of incident light absorbed by a colored standard and $A_2$ is the fraction of light absorbed by a colored sample, in terms of mechanical movement and the other containing means for measuring the ratio of $$\frac{1-A_1}{1-A_0}$$

where $A_1$ is the fraction of light absorbed by a similar colored standard and $A_0$ is the fraction of light absorbed by a white standard, in terms of mechanical movement, means for causing the bands of monochromated light entering the photometering systems of the flickering beam type to pass through the spectrum, a recording surface, means for moving the recording surface in one direction in proportion to the passage of the bands of monochromated light through the spectrum, a recording instrument movable over the recording surface at right angles to the movement of the surface and means for causing the recording element to move in proportion to the product of the two mechanical movements.

4. A differential recording spectrophotometric system according to claim 2 in which the recording surface is on a drum rotated in proportion to the passage of the bands of monochromated light through the spectrum, the recording element is a stylus moving axially on said drum and operated by a lever, one end of which is moved in proportion to one of the mechanical movements, the lever being fulcrumed in a frame work which is moved at right angles to the axis of the drum in proportion to the other mechanical movement.

5. A differential recording spectrophotometric system comprising monochromating means for passing bands of monochromated light of equal wave length through two photometric systems of the flickering beam type, each system being provided with a rotating photometering element driven by an electric motor actuated from amplified flicker frequency current through a drive of varying ratio so that the movement of the motor shaft is in proportion to the ratio $$\frac{A_1-A_2}{1-A_1}$$

where $A_1$ is the fraction of incident light absorbed by a colored standard and $A_2$ is the fraction of light absorbed by a colored sample, in the case of the first system and the ratio of $$\frac{1-A_1}{1-A_0}$$

where $A_1$ is the fraction of light absorbed by a similar colored standard and $A_0$ is the fraction of light absorbed by a white standard, in the case of the second system, splines on one of the motor shafts, a bevel gear movable on but keyed to the splined portion of the shaft, a bevel pinion meshing with said gear and driving a threaded shaft at right angles to the splined shaft, said shaft being journaled in a movable frame and containing a movable nut thereon, the second movable shaft being provided with a threaded portion, the frame having an arm journaled on the splined shaft but not keyed thereto and carrying a nut on the threaded portion of the second shaft, a drum for carrying a recording surface having its axis parallel to the threaded shaft driven by beveled gears, said drum having driving connection with the monochromating means so that the rotation of the drum is in proportion to the travel of the bands of monochromated light through the spectrum, a rigidly mounted frame parallel to the surface of the drum and spaced a short distance therefrom, a supporting stylus movable along said frame and engaging the recording surface, a bushing attached to said stylus and capable of rotating thereon about an axis perpendicular to the axis of the drum, a rod journaled in said bushing, a fulcrum on the movable frame, the rod passing through the fulcrum and being attached to the nut on the threaded shaft driven by the beveled gears.

ROBERT HIRAM PARK.